US012074016B2

(12) United States Patent
Kobayashi et al.

(10) Patent No.: US 12,074,016 B2
(45) **Date of Patent: *Aug. 27, 2024**

(54) ION DETECTOR

(71) Applicant: HAMAMATSU PHOTONICS K.K., Hamamatsu (JP)

(72) Inventors: Hiroshi Kobayashi, Hamamatsu (JP); Sayaka Takatsuka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 489 days.

This patent is subject to a terminal disclaimer.

(21) Appl. No.: 17/333,129

(22) Filed: May 28, 2021

(65) Prior Publication Data

US 2021/0391162 A1 Dec. 16, 2021

(30) Foreign Application Priority Data

Jun. 11, 2020 (JP) ................................ 2020-101542

(51) Int. Cl.
*H01J 49/02* (2006.01)

(52) U.S. Cl.
CPC .................................. *H01J 49/025* (2013.01)

(58) Field of Classification Search
CPC ........ H01J 49/025; H01J 43/04; H01J 43/246; H01J 49/06
See application file for complete search history.

(56) References Cited

U.S. PATENT DOCUMENTS

| | | | |
|---|---|---|---|
| 5,326,978 A | 7/1994 | Aebi et al. | |
| 2008/0073548 A1 | 3/2008 | Denton et al. | |
| 2013/0187057 A1 | 7/2013 | Kobayashi et al. | |
| 2018/0174810 A1* | 6/2018 | Suyama | G01T 1/241 |

FOREIGN PATENT DOCUMENTS

| | | |
|---|---|---|
| JP | H7-073847 A | 3/1995 |
| JP | H11-288684 A | 10/1999 |
| JP | 4848363 B2 | 12/2011 |
| JP | 4869526 B2 | 2/2012 |
| JP | 2013-175440 A | 9/2013 |
| JP | 2017-016918 A | 1/2017 |
| WO | WO-01/018846 A2 | 3/2001 |
| WO | WO-2005/104178 A2 | 11/2005 |

* cited by examiner

*Primary Examiner* — David E Smith
*Assistant Examiner* — Christopher J Gassen
(74) *Attorney, Agent, or Firm* — Faegre Drinker Biddle & Reath LLP

(57) ABSTRACT

An ion detector includes a microchannel plate configured to generate secondary electrons upon reception of ions incident thereon and multiply and output the generated secondary electrons; a plurality of electron impact-type diodes configured to have effective regions narrower than an effective region of the microchannel plate, receive the incident secondary electrons output from the microchannel plate, and multiply and detect the incident secondary electrons; a focus electrode configured to be disposed between the microchannel plate and the electron impact-type diodes and focus the secondary electrons toward the electron impact-type diodes; and a voltage supply part configured to apply a drive voltage to each of the plurality of electron impact-type diodes.

8 Claims, 7 Drawing Sheets

ION DETECTOR

TECHNICAL FIELD

The present disclosure relates to an ion detector. For example, the ion detector according to the present disclosure may be used in mass analysis.

BACKGROUND

Patent Document 1 (Japanese Patent No. 4869526) discloses a mass spectrometer. This mass spectrometer includes a pair of microchannel plates configured to generate secondary electrons due to an ion beam, a first anode configured to detect some of the secondary electrons generated by the microchannel plate, and a second anode configured to be disposed at a stage behind the first anode and detect secondary electrons that are generated by the microchannel plate and have passed through a perforation of the first anode.

Patent Document 2 (Japanese Patent No. 4848363) discloses an ion detector in the related art. This ion detector in the related art includes two microchannel plates configured to overlap each other, a first power collection anode configured to detect a great part of secondary electrons emitted from the microchannel plate, and a second power collection anode configured to detect the remainder of the secondary electrons emitted from the microchannel plate.

SUMMARY

In the mass spectrometer described in Patent Document 1, increase in dynamic range is achieved by selecting a ratio of a cross-sectional area of a perforation to the total cross-sectional area of the first anode such that a certain degree of attenuation is applied to an incident secondary electron beam. In addition, in the ion detector described in Patent Document 2, expansion in dynamic range is achieved by using two power collection anodes, such as a first power collection anode and a second power collection anode, having different sizes. In this manner, in the foregoing technical field, it is desired to expand the dynamic range.

On the other hand, Patent Document 3 (Japanese Unexamined Patent Publication No. 2017-16918) discloses a charged particle detector including a microchannel plate configured to emit secondary electrons in accordance with charged particles incident thereon, a focus electrode configured to focus secondary electrons emitted from the microchannel plate, and an electron impact-type diode configured to multiply and detect secondary electrons upon reception of focused secondary electrons incident thereon. Also in a charged particle detector having such a constitution, it is desirable to expand a dynamic range as described above.

Here, an object of an aspect of the present disclosure is to provide an ion detector capable of expanding a dynamic range.

According to the aspect of the present disclosure, there is provided an ion detector including a microchannel plate configured to generate secondary electrons upon reception of ions incident thereon and multiply and output the generated secondary electrons; a plurality of electron impact-type diodes having effective regions narrower than an effective region of the microchannel plate, configured to receive the incident secondary electrons output from the microchannel plate, and multiply and detect the incident secondary electrons; a focus electrode disposed between the microchannel plate and the electron impact-type diodes and configured to focus the secondary electrons toward the electron impact-type diodes; and a voltage supply part configured to apply a drive voltage to each of the plurality of electron impact-type diodes. The voltage supply part applies drive voltages having values different from each other to at least the two respective electron impact-type diodes of the plurality of electron impact-type diodes to make gains thereof different from each other.

This ion detector has a constitution including the microchannel plate, the focus electrode, and the electron impact-type diodes. As described above, even in the ion detector having such a constitution, it is desired to expand a dynamic range. Here, in this ion detector, the voltage supply part applying drive voltages to the plurality of electron impact-type diodes applies drive voltages having values different from each other to at least two respective electron impact-type diodes to make gains thereof different from each other. Accordingly, for example, favorable detection results can be obtained over a wide range of the number of incident ions by employing detection using an electron impact-type diode having a relatively high gain when the number of incident ions is small, and employing detection using an electron impact-type diode having a relatively low gain when the number of incident ions is large. That is, according to this ion detector, the dynamic range can be expanded.

The effective region of each of the plurality of electron impact-type diodes may be included in a focusing range of the secondary electrons due to the focus electrode. In this case, secondary electrons can be uniformly incident on the effective regions of the plurality of electron impact-type diodes.

The electron impact-type diodes may include the effective region and a non-effective region positioned around the effective region when viewed in an incident direction of secondary electrons in the electron impact-type diodes. When viewed in the incident direction, the effective region may be unevenly distributed in at least one direction with respect to a center of the non-effective region. At least the two electron impact-type diodes may be disposed such that sides having the unevenly distributed effective regions are adjacent to each other. In this case, a dead space can be reduced by disposing the effective regions of the electron impact-type diodes closer to each other.

The ion detector may further include a mask disposed between the focus electrode and the electron impact-type diode and configured to block some of the secondary electrons incident on at least one of the electron impact-type diodes. In this manner, a mask may be used when controlling a gain of incident ions.

The mask may be formed on an electron incident surface of the electron impact-type diode. The mask may be disposed away from an electron incident surface of the electron impact-type diode.

The ion detector may further include a cover disposed between the focus electrode and the electron impact-type diode and having an opening formed to be wider than the effective regions of the plurality of electron impact-type diodes when viewed in an incident direction of secondary electrons of the electron impact-type diodes. The mask may be provided in the opening. In this case, a mask can be constituted in the cover while imparting a function of preventing charging up thereto.

The voltage supply part may apply the drive voltages to at least the two electron impact-type diodes such that a detection range of the electron impact-type diode having a relatively high gain and a detection range of the electron impact-type diode having a relatively low gain have overlapping ranges overlapping each other. In this case, calibration of the two electron impact-type diodes can be performed utilizing the overlapping ranges.

According to the present disclosure, it is possible to provide an ion detector capable of expanding a dynamic range.

DETAILED DESCRIPTION

Hereinafter, an ion detector according to an embodiment will be described. In description of each drawing, the same reference signs are applied to elements which are the same or corresponding, and duplicate description may be omitted.

Figure 1A:
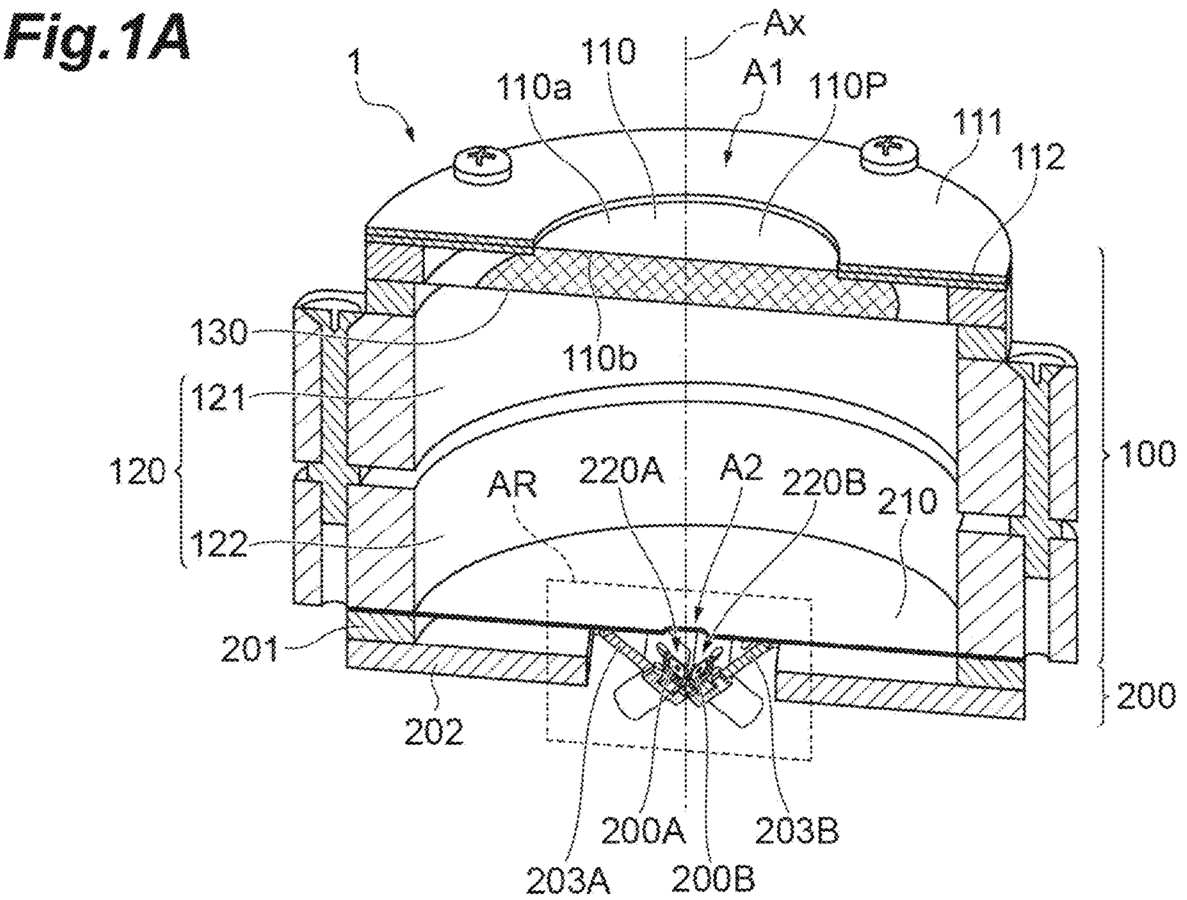
FIG. 1A is a view illustrating an ion detector according to an embodiment and is a cross-sectional view of the entirety.
Figure 1B:
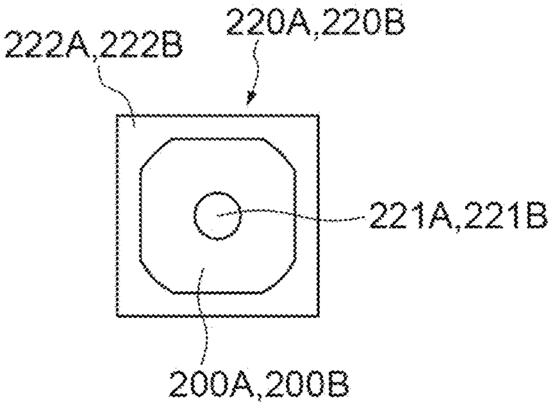
FIG. 1B is a plan view of an electron impact-type diode illustrated in FIG. 1A.

FIG. 1A is a view illustrating an ion detector according to an embodiment and is a cross-sectional view of the entirety. FIG. 1B is a plan view of an electron impact-type diode illustrated in FIG. 1A. As illustrated in FIGS. 1A and 1B, an ion detector 1 includes a first unit 100 and a second unit 200. The first unit 100 has a microchannel plate (an MCP 110), electron lenses 120, and a mesh electrode 130. For example, the ion detector 1 may be used in mass analysis.

The MCP 110 exhibits a circular plate shape having an input surface 110*a* and an output surface 110*b* on a side opposite to the input surface 110*a*. The MCP 110 is gripped by an input side electrode 111 and an output side electrode 112. As an example, the MCP 110 includes a main body that is a thin disk-shaped structure having lead glass as a main component, and channels that are a plurality of penetration holes extending in a thickness direction (a direction toward the output surface 110*b* from the input surface 110*a*) except for a toric outer circumferential part are formed in the main body. In addition, electrodes are formed in the outer circumferential part of the input surface 110*a* and the outer circumferential part of the output surface 110*b*.

The MCP 110 generates secondary electrons upon reception of ions incident thereon through the input surface 110*a*, multiplies generated secondary electrons, and outputs the secondary electrons through the output surface 110*b*. A gain in the MCP 110 is determined based on a ratio between a channel length corresponding to the thickness of the MCP 110 and a channel diameter and a unique secondary electron emission coefficient of a material. For example, the gain is within a range of approximately 1 to $10^4$ (for example, 200).

An opening A1 is formed in the input side electrode 111 and the output side electrode 112. The opening A1 is formed to have a circular shape orthogonal to the input surface 110*a* and the output surface 110*b* and centering on a reference axis Ax passing through the center of the MCP 110. The opening A1 regulates an effective region 110P of the MCP 110. That is, when viewed in a direction along the reference axis Ax, a region exposed through the opening A1 in the MCP 110 is regulated as the effective region 110P of the MCP 110.

The electron lenses 120 are disposed on the output surface 110*b* side in the MCP 110. Each of the electron lenses 120 includes a pair of focus electrodes 121 and 122 disposed such that the reference axis Ax is surrounded. The focus electrodes 121 and 122 are formed to have a cylindrical shape centering on the reference axis Ax. The focus electrode 121 is fixed to the mesh electrode 130 with an insulating spacer therebetween. The focus electrode 122 is fixed to the focus electrode 121 with an insulating spacer therebetween. That is, the mesh electrode 130 is disposed between the MCP 110 and the electron lenses 120 (the focus electrode 121).

A potential of the mesh electrode 130 is set higher than a potential of the output surface 110*b* of the MCP 110, and the mesh electrode 130 functions to accelerate electrons, to reduce the relative angular component, and to increase the electron convergence. The focus electrodes 121 and 122 are disposed between the MCP 110 and the electron impact-type diodes (which will be described below) and focus secondary electrons output from the MCP 110 toward the electron impact-type diodes.

Figure 2A:
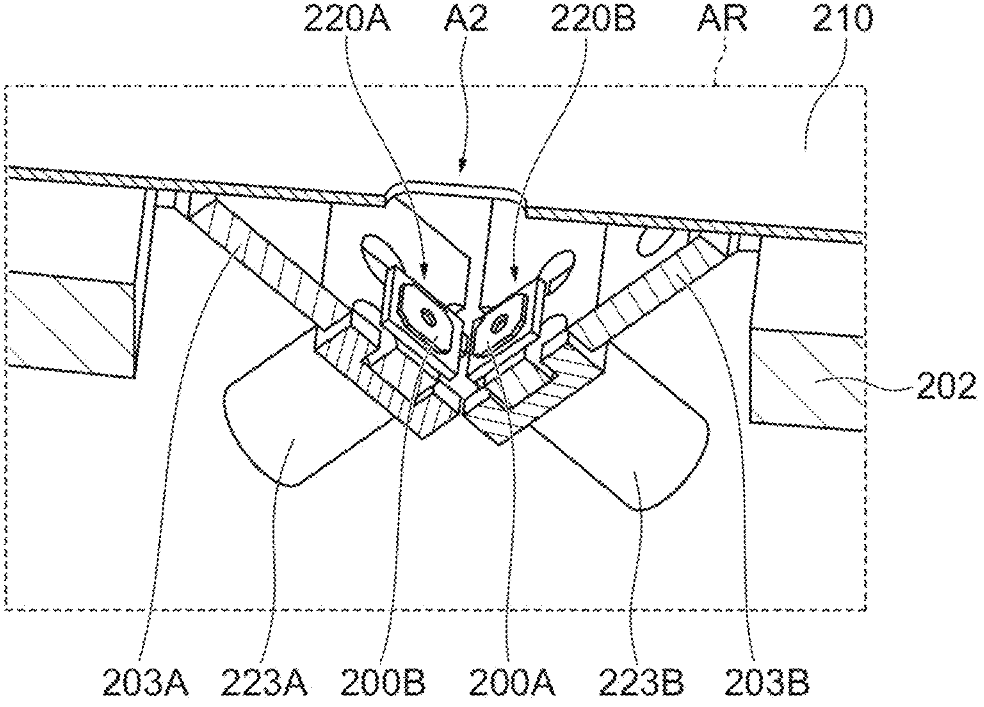
FIG. 2A is a partial enlarged view of the ion detector illustrated in FIG. 1A and is an enlarged view of a region AR in FIG. 1A.
Figure 2B:
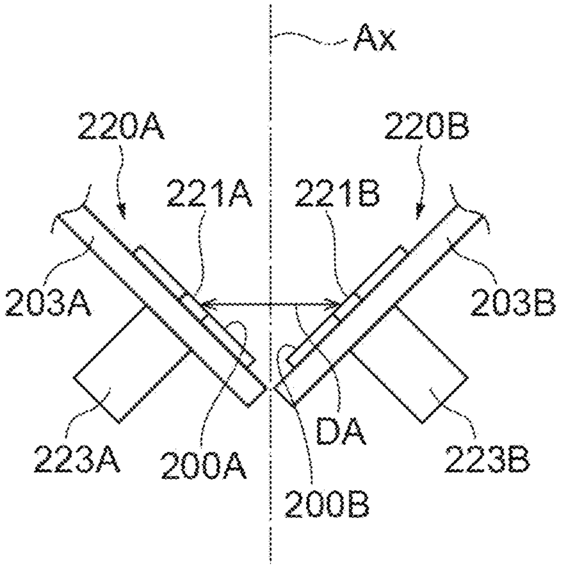
FIG. 2B is a partial side view of the region AR.

FIG. 2A is a partial enlarged view of the ion detector illustrated in FIG. 1A and is an enlarged view of a region AR in FIG. 1A. FIG. 2B is a partial side view of the region AR. As illustrated in FIGS. 1A, 1B, 2A, and 2B, the second unit 200 is provided on a side opposite to the MCP 110 in the focus electrode 122. The second unit 200 has a cover 210 and a plurality of (here, two) electron impact-type diodes 220A and 220B.

The electron impact-type diodes 220A and 220B are elements of single-channels. Each of the electron impact-type diodes 220A and 220B receives incident secondary electrons output from the MCP 110 and focused by the focus electrodes 121 and 122 and multiplies and detects incident secondary electrons. For example, the electron impact-type diodes 220A and 220B are avalanche diodes. In this case, for example, gains of the electron impact-type diodes 220A and 220B are within a range of 100 to 800 (for example, 400) in terms of electron collision gain and within a range of 1 to $10^2$ (for example, 50) in terms of avalanche gain. Accordingly, the total gain of the ion detector 1 is approximately $10^6$ (as an example, $4\times10^6$), for example.

The electron impact-type diode 220A is mounted on a substrate 203A. The substrate 203A is attached to the focus electrode 122 with an insulating spacer 201 therebetween and fixed to a base 202 constituting a bottom part of the ion detector 1. Similarly, the electron impact-type diode 220B is mounted on a substrate 203B fixed to the base 202.

The electron impact-type diode 220A faces the MCP 110 and the focus electrodes 121 and 122 side and includes an electron incident surface 200A receiving incident secondary electrons. The electron impact-type diode 220A includes an effective region 221A positioned at the center of the electron incident surface 200A when viewed in an incident direction of secondary electrons (a direction along the reference axis Ax) and detecting electrons, and a non-effective region 222A positioned around the effective region 221A, covered with a mask, and not detecting electrons, for example.

The electron impact-type diode 220B faces the MCP 110 and the focus electrodes 121 and 122 side and includes an electron incident surface 200B receiving incident secondary electrons. The electron impact-type diode 220B includes an effective region 221B positioned at the center of the electron incident surface 200B when viewed in the incident direction of secondary electrons (a direction along the reference axis Ax) and detecting electrons, and a non-effective region 222B positioned around the effective region 221B, covered with a mask, and not detecting electrons, for example. The effective regions 221A and 221B of the electron impact-type diodes 220A and 220B are narrower than the effective region 110P of the MCP 110. The effective regions 221A and 221B of the respective electron impact-type diodes 220A and 220B are included in a focusing range of secondary electrons due to the focus electrodes 121 and 122 on the electron incident surfaces 200A and 200B.

Here, the electron impact-type diodes 220A and 220B are symmetrically disposed centering on the reference axis Ax. More specifically, a pair of electron impact-type diodes 220A and 220B are disposed such that corner parts projecting to a side opposite to the MCP 110 are formed due to the electron incident surfaces 200A and 200B thereof (or due to an extended plane of the electron incident surfaces 200A and 200B) and supported by the base 202 with the substrates 203A and 203B therebetween. Here, the corner parts formed by the electron incident surfaces 200A and 200B have the reference axis Ax as an apex. Here, the substrates 203A and 203B themselves for mounting the electron impact-type diodes 220A and 220B are inclined to form corner parts projecting to a side opposite to the MCP 110.

Accordingly, for example, compared to a case in which the electron impact-type diodes 220A and 220B are disposed such that the electron incident surfaces 200A and 200B are positioned on the same plane, a distance DA between the effective regions 221A and 221B of the electron impact-type diodes 220A and 220B is shortened. That is, the effective regions 221A and 221B are disposed close to each other.

On the other hand, the electron impact-type diode 220A is provided with an output terminal 223A (an output port (a coaxial connector)) for outputting a detection signal for secondary electrons. The output terminal 223A protrudes and extends from a surface on a side opposite to a surface on which the electron impact-type diode 220A is provided on the substrate 203A. In addition, the electron impact-type diode 220B is provided with an output terminal 223B (an output port (a coaxial connector)) for a similar purpose. The output terminal 223B protrudes and extends from a surface on a side opposite to a surface on which the electron impact-type diode 220B is provided on the substrate 203B.

Further, the output terminals 223A and 223B (extended lines of the output terminals 223A and 223B in an extending direction) are disposed such that corner parts projecting to the electron incident surfaces 200A and 200B and the MCP 110 side are formed. Here, the corner parts formed by the electron incident surfaces 200A and 200B and the corner parts formed by the output terminals 223A and 223B project in directions opposite to each other.

The cover 210 is disposed between the focus electrode 122 and the electron impact-type diodes 220A and 220B and sandwiched between the focus electrode 122 and the base 202 with the insulating spacer 201 or the like therebetween, for example. An opening A2 centering on the reference axis Ax is formed in the cover 210. When viewed in the incident direction of secondary electrons in the electron impact-type diodes 220A and 220B, the opening A2 is wider than the effective regions 221A and 221B of the electron impact-type diodes 220A and 220B. Particularly, the opening A2 is a long hole having a direction in which the effective regions 221A and 221B are arranged as a longitudinal direction. Accordingly, the effective regions 221A and 221B are exposed through the opening A2 when viewed in the incident direction of secondary electrons in the electron impact-type diodes 220A and 220B. The opening A2 is narrower than the opening A1. For example, the cover 210 is made of stainless steel.

Figure 3:
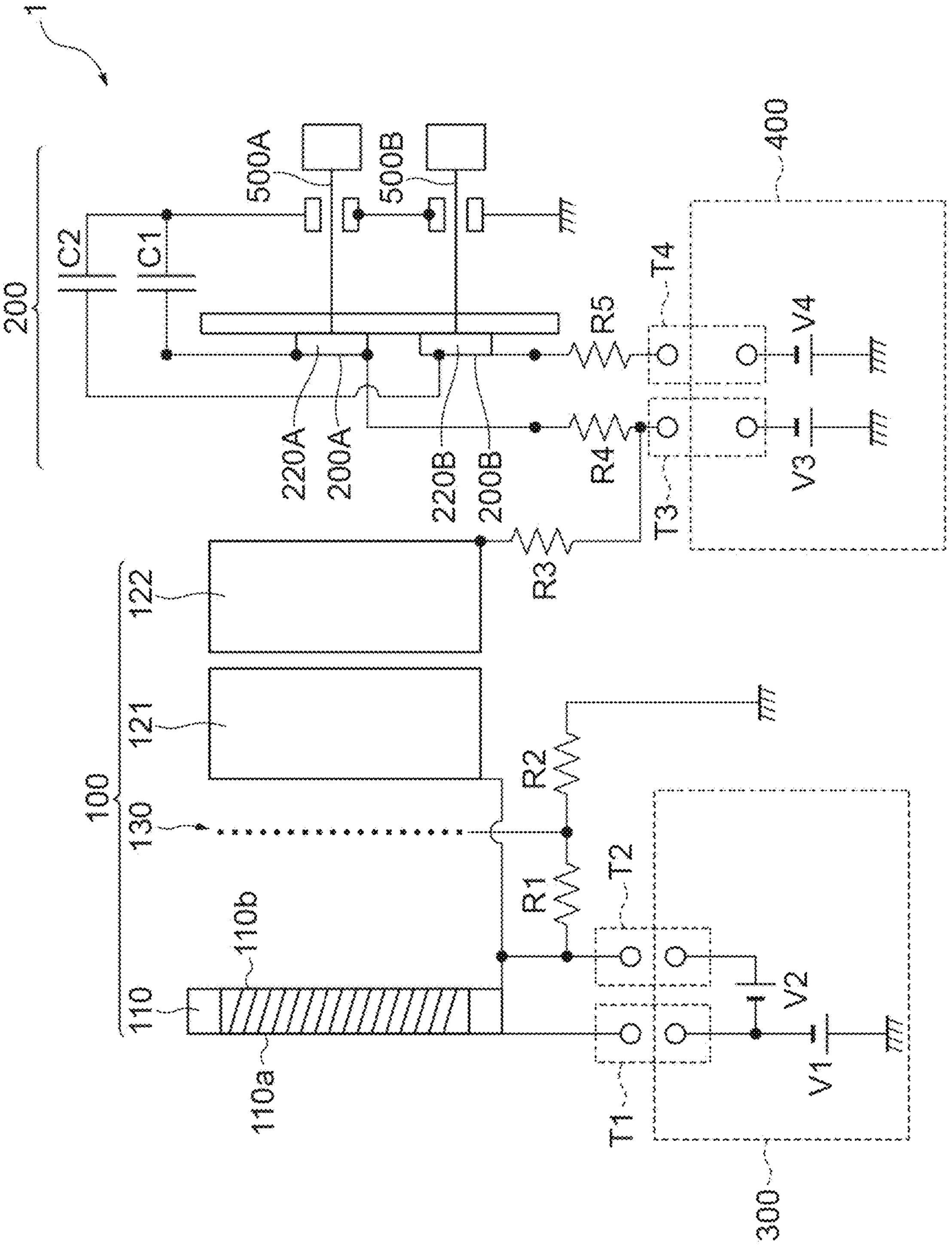
FIG. 3 is a schematic circuit diagram illustrating an example of the ion detector illustrated in FIGS. 1A, 1B, 2A, and 2B.

Subsequently, a relationship of electrical connection in the ion detector 1 will be described. FIG. 3 is a schematic circuit diagram illustrating an example of the ion detector illustrated in FIGS. 1A, 1B, 2A, and 2B. As illustrated in FIG. 3, the ion detector 1 includes a main part and a voltage supply circuit. The main part is constituted of the first unit 100 and the second unit 200 described above. In the first unit 100, a resistance value between the input surface 110*a* and the output surface 110*b* of the MCP 110 is 30 MΩ, for example. The mesh electrode 130 is connected to a portion between a resistor R1 and a resistor R2 and connected to a ground potential GND with the resistor R2 therebetween. The focus electrode 121 is set to the same potential as the output surface 110*b* of the MCP 110. The focus electrode 122 is connected to a negative potential with a resistor R3 therebetween.

In the second unit 200, the electron impact-type diode 220A includes one terminal connected to the negative potential with a resistor R4 therebetween, and the other terminal connected to the ground potential GND with a capacitance C1 therebetween. A detection signal of the electron impact-type diode 220A is taken out from a signal line 500A connected to the output terminal 223A. The electron impact-type diode 220B includes one terminal connected to the negative potential with a resistor R5 therebetween, and the other terminal connected to the ground potential GND with a capacitance C2 therebetween. A detection signal of the electron impact-type diode 220B is taken out from a signal line 500B connected to the output terminal 223B.

The voltage supply circuit includes a power supply unit 300 and a power supply unit (a voltage supply part) 400. The power supply unit 300 includes a power supply V1 for setting a potential of the input surface 110*a* of the MCP 110 with a terminal T1 therebetween, and a power supply V2 for ensuring a predetermined potential difference between a terminal T2 and the terminal T1 connected to the output surface 110*b* of the MCP 110. The power supply V1 is disposed between the ground potential GND and the terminal T1 and generates an electromotive force for setting the potential of the terminal T1 to −7 kV, for example. The power supply V2 generates an electromotive force as a potential difference between the input surface 110*a* and the output surface 110*b* such that a potential difference within a range of approximately 0 to 3.5 kV is ensured, for example.

The power supply unit 400 includes a power supply V3 connected to one terminal of the electron impact-type diode 220A with a terminal T3 and the resistor R4 therebetween, and a power supply V4 connected to one terminal of the electron impact-type diode 220B with a terminal T4 and the resistor R5 therebetween. The power supply V3 is disposed between the ground potential GND and the terminal T3 and generates an electromotive force for setting the potential of the terminal T3 to 350 V, for example. The power supply V4 is disposed between the ground potential GND and the terminal T4 and generates an electromotive force for setting the potential of the terminal T4 to a potential different from the potential of the terminal T3, for example, 250 V.

Namely, the power supply unit 400 applies a drive voltage to each of the electron impact-type diodes 220A and 220B and applies drive voltages having values different from each other to the respective electron impact-type diodes 220A and 220B to make gains thereof different from each other. The difference between the gains of the electron impact-type diodes 220A and 220B is approximately 10 times, for example. In this manner, in the ion detector 1, secondary electrons emitted from the MCP 110 are input to a plurality of (here, two) electron impact-type diodes 220A and 220B having different gains while being focused by the focus electrodes 121 and 122.

Figure 4A:
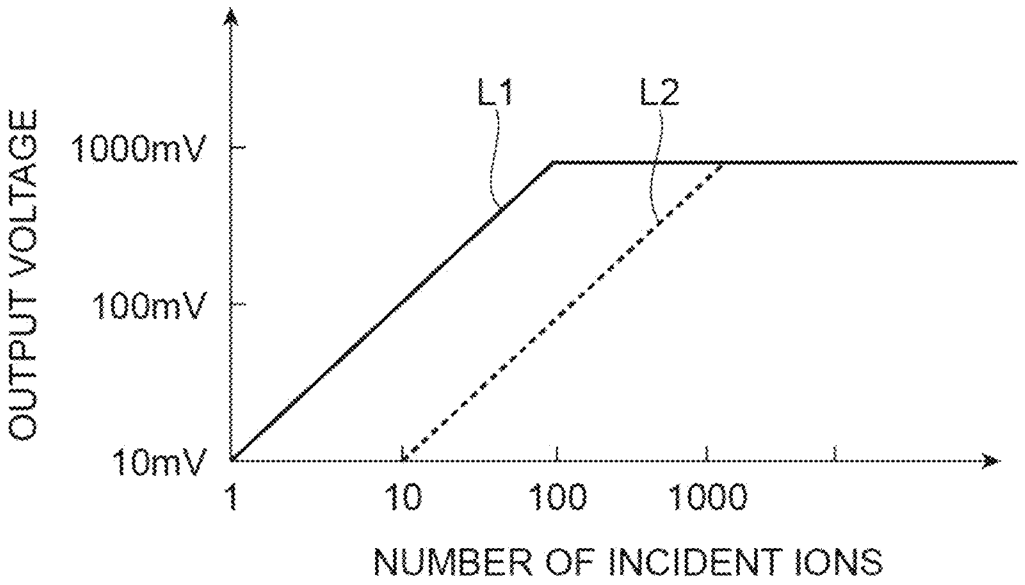
FIG. 4A is a graph for describing operation and effects of the ion detector illustrated in FIGS. 1A, 1B, 2A, 2B, and 3 and relates to an example of a case of using one electron impact-type diode (or a case of using a plurality of electron impact-type diodes with the same gain).

Subsequently, operations and effects of the ion detector 1 will be described. FIG. 4A is a graph for describing operation and effects of the ion detector illustrated in FIGS. 1A, 1B, 2A, 2B, and 3 and relates to an example of a case of using one electron impact-type diode (or a case of using a plurality of electron impact-type diodes with the same gain).

Figure 4B:
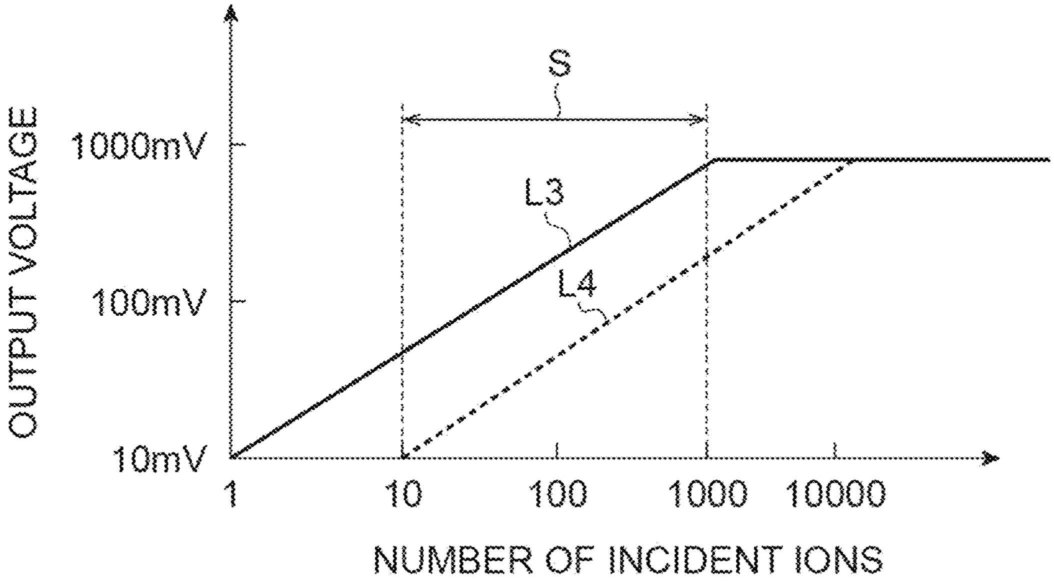
FIG. 4B is a graph for describing operation and effects of the ion detector illustrated in FIGS. 1A, 1B, 2A, 2B, and 3 and relates to the ion detector according to the embodiment.

FIG. 4B is a graph for describing operation and effects of the ion detector illustrated in FIGS. 1A, 1B, 2A, 2B, and 3 and relates to the ion detector according to the embodiment. In this case, when the gain is a relatively high (line L1), if a large amount of ions are incident on the ion detector (if the number of incident ions increases), saturation of the detector or overrange of the digitizer occurs. On the other hand, in this case, when the gain is a relatively low (line L2), it is difficult to detect a single ion. Therefore, there is a need to perform measurement a plurality of times while varying the gain.

In contrast, as illustrated in FIG. 4B, in the ion detector 1 according to the present embodiment, when the number of incident ions is small, a single ion can be favorably detected utilizing a detection signal (line L3) of the electron impact-type diode having a relatively high gain, and when the number of incident ions is large, the influence of saturation of the detector can be reduced utilizing a detection signal (line L4) of the electron impact-type diode having a relatively low gain and a high upper limit for the number of incident ions of saturation. Namely, according to the ion detector 1, the dynamic range can be expanded. FIG. 4B is a graph for describing operation and effects of the ion detector illustrated in FIGS. 1A, 1B, 2A, 2B, and 3 and relates to the ion detector according to the embodiment.

In the ion detector 1, the power supply unit 400 applies drive voltages to the electron impact-type diodes 220A and 220B such that a detection range of the electron impact-type diode (here, a range of the number of incident ions within approximately 1 to 1,000) having a relatively high gain and a detection range of the electron impact-type diode (here, a range of the number of incident ions within approximately 10 to 10,000) having a relatively low gain have overlapping ranges S partially overlapping each other.

The overlapping range S is a range between the lower limit for the number of incident ions (here, approximately 10) which can be detected by the electron impact-type diode having a relatively low gain and the upper limit for the number of incident ions (here, approximately 1,000) which can be detected by the electron impact-type diode having a relatively high gain. By providing such overlapping ranges S, calibration of the electron impact-type diodes having gains different from each other can be performed utilizing the overlapping ranges S.

As described above, the ion detector 1 has a constitution including the MCP 110, the focus electrodes 121 and 122, and the electron impact-type diodes 220A and 220B. Even in the ion detector 1 having such a constitution, it is desired to expand the dynamic range. Here, in this ion detector 1, the power supply unit 400 applies drive voltages having values different from each other to two respective electron impact-type diodes 220A and 220B to make gains thereof different from each other. Accordingly, for example, favorable detection results can be obtained over a wide range of the number of incident ions by employing detection using the electron impact-type diode having a relatively high gain when the number of incident ions is small, and employing detection using the electron impact-type diode having a relatively low gain when the number of incident ions is large. That is, according to this ion detector 1, the dynamic range can be expanded. In the ion detector 1, when using a plurality of electron impact-type diodes having different gains in this manner, crosstalk can be curbed using a plurality of single-channel elements compared to a case of using a multi-channel element.

In addition, in the ion detector 1, the effective regions 221A and 221B of the respective electron impact-type diodes 220A and 220B are included in the focusing range of secondary electrons due to the focus electrodes 121 and 122. For this reason, secondary electrons can be uniformly incident on the effective regions 221A and 221B of the electron impact-type diodes 220A and 220B.

In addition, in the ion detector 1, the pair of electron impact-type diodes 220A and 220B are disposed such that corner parts projecting to a side opposite to the MCP 110 are formed due to the electron incident surfaces 200A and 200B thereof. For this reason, compared to a case in which the electron incident surfaces 200A and 200B thereof are disposed on the same plane, the effective regions 221A and 221B can be disposed closer to each other.

By disposing the effective regions 221A and 221B of the electron impact-type diodes 220A and 220B closer to each other, the effective regions 221A and 221B can be included within a focusing diameter of secondary electrons due to the focus electrodes 121 and 122. Alternatively, secondary electrons can be focused in a narrower range due to the focus electrodes 121 and 122. Furthermore, the total gain of incident ions can be reliably ensured.

In addition, the ion detector 1 includes the cover 210 disposed between the focus electrodes 121 and 122 and the electron impact-type diodes 220A and 220B and having the opening A2 formed to be wider than the effective regions 221A and 221B when viewed in the incident direction of secondary electrons of the electron impact-type diodes 220A and 220B. For this reason, charging up can be prevented by the cover 210.

In addition, in the ion detector 1, the opening A2 is a long hole having a direction in which the effective regions 221A and 221B of the electron impact-type diodes 220A and 220B are arranged as the longitudinal direction. For this reason, secondary electrons can be favorably incident on the pair of electron impact-type diodes 220A and 220B having the effective regions 221A and 221B disposed closer to each other as described above via the long hole of the cover 210.

Moreover, in the ion detector 1, the electron impact-type diodes 220A and 220B is provided with the respective output terminals 223A and 223B for outputting a detection signal on a side opposite to the electron incident surfaces 200A and 200B. Further, the output terminals 223A and 223B are disposed such that corner parts projecting to the electron incident surfaces 200A and 200B side are formed.

When the effective regions 221A and 221B of the pair of electron impact-type diodes 220A and 220B are disposed close to each other as described above, the output terminals 223A and 223B can be disposed in this manner.

The embodiment described above illustrates an example of the ion detector according to the present disclosure. Therefore, the ion detector according to the present disclosure may be an arbitrary modification of that described above. Subsequently, a modification example will be described.

Figure 5:
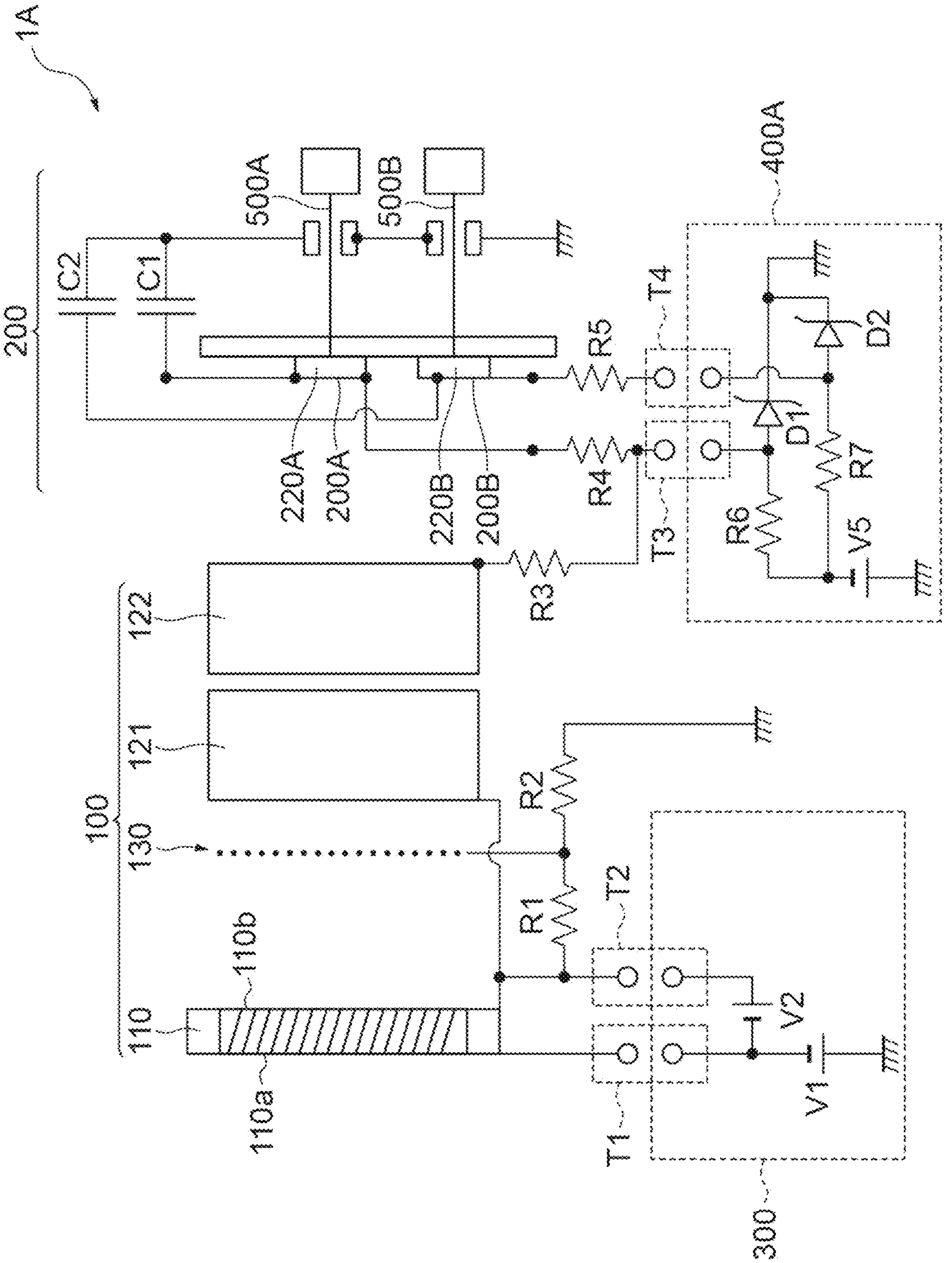
FIG. 5 is a schematic circuit diagram of an ion detector according to a modification example.

FIG. 5 is a schematic circuit diagram of an ion detector according to a modification example. As illustrated in FIG. 5, compared to the ion detector 1, an ion detector 1A differs from the ion detector 1 in including a power supply unit 400A in place of the power supply unit 400 and is otherwise coincides with the ion detector 1. The power supply unit (voltage supply part) 400A includes a single power supply V5 connected to one terminal of the electron impact-type diode 220A with a resistor R6, the terminal T3, and the resistor R4 therebetween and connected to one terminal of the electron impact-type diode 220B with a resistor R7, the terminal T4, and the resistor R5 therebetween. In addition, the power supply unit 400A includes a Zener diode D1 interposed between the resistor R6 and the ground potential GND, and a Zener diode D2 interposed between the resistor R7 and the ground potential GND.

Also in such a power supply unit 400A, for example, drive voltages having values different from each other can be applied to the two respective electron impact-type diodes 220A and 220B by adjusting a relative relationship between the resistance values of the resistor R6 and the resistor R7 to make gains thereof different from each other. In addition, in the ion detector 1, using the Zener diodes D1 and D2, voltages can be supplied to the two electron impact-type diodes 220A and 220B using one power supply V5.

Figure 6:
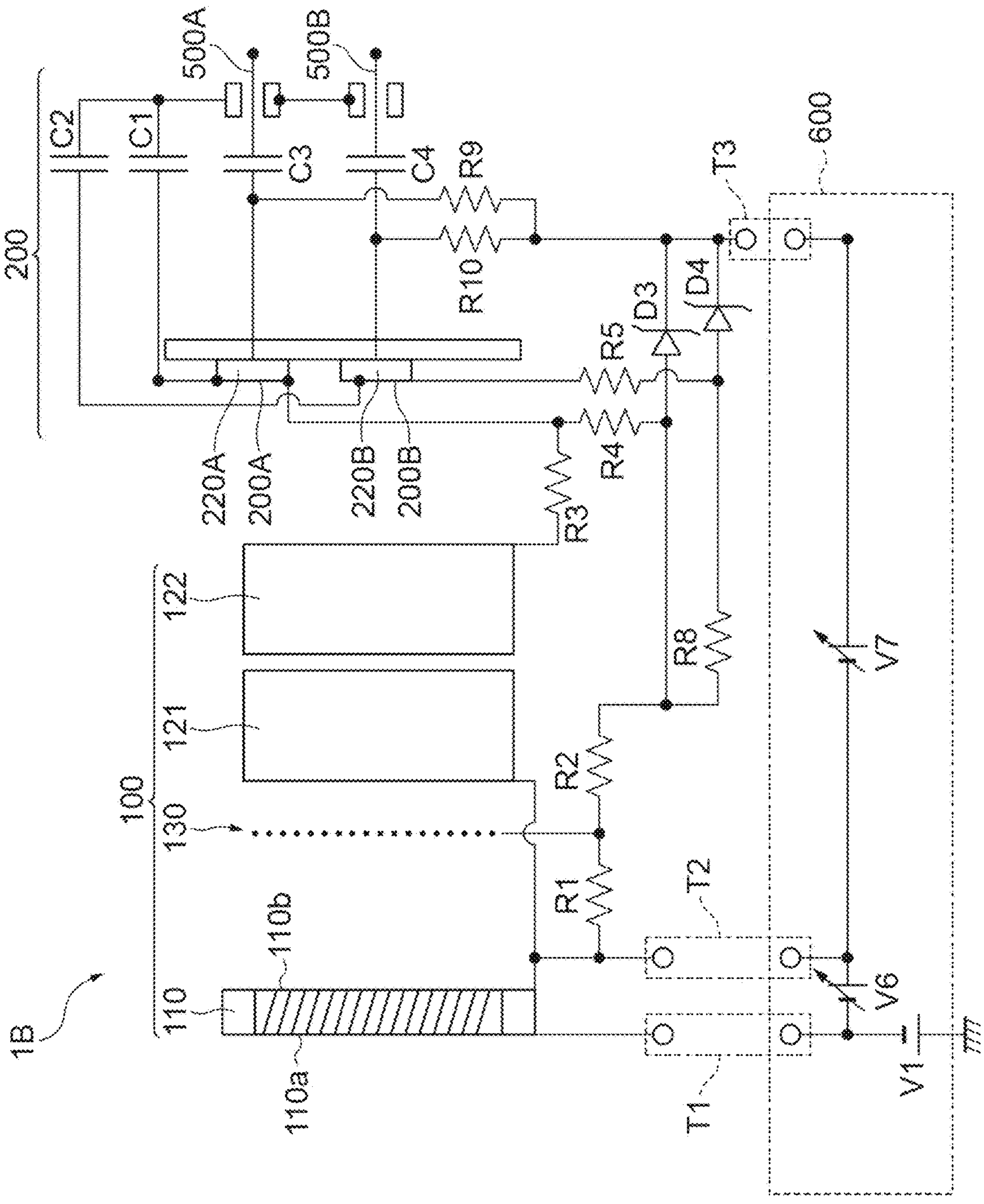
FIG. 6 is a schematic circuit diagram of an ion detector according to another modification example.

FIG. 6 is a schematic circuit diagram of an ion detector according to another modification example. As illustrated in FIG. 6, an ion detector 1B includes a power supply unit 600 as a voltage supply circuit. In the power supply unit 600, the power supply V1 is connected to the input surface 110*a* of the MCP 110 with the terminal T1 therebetween. The power supply V1 has a function of floating the ion detector 1B. The power supply unit 600 has a power supply V6 and a power supply V7. The power supply V6 is interposed between the terminal T1 connected to the input surface 110*a* and the terminal T2 connected to the output surface 110*b*. The power supply V6 applies a voltage (for example, 0 V to 1,000 V) to the MCP 110. The power supply V7 is interposed between the terminal T2 and the terminal T3. The power supply V7 supplies a voltage (for example, 3 kV to 7 kV) to the focus electrodes 121 and 122 at a stage behind the MCP 110 and the electron impact-type diodes 220A and 220B.

In addition, the resistors R1 and R2 serve as bleeder resistors for supplying a potential of the mesh electrode 130 and the focus electrodes 121 and 122. The capacitances C1 and C2 form a loop in which a high-speed signal can return to the other terminals of the electron impact-type diodes 220A and 220B via the ground potential GND at a low impedance. The capacitances C1 and C2 and the resistors R4 and R5 constitute low-pass filters and have a function of removing noise of the power supply. The resistor R3 has a function of preventing coupling between the focus electrode 122 and the ground potential GND.

A capacitance C3 is provided in the signal line 500A connected to the output terminal 223A of the electron impact-type diode 220A, and a capacitance C4 is provided in the signal line 500B connected to the output terminal 223B of the electron impact-type diode 220B. The capacitances C3 and C4 are coupling capacitors, allowing a high-frequency signal to pass through while maintaining the potential of the other terminals of the electron impact-type diodes 220A and 220B. A resistor R9 is connected to a stage in front of the capacitance C3 in the signal line 500A. In addition, a resistor R10 is provided at a stage in front of the capacitance C4 in the signal line 500B.

The resistors R9 and R10 are blocking resistors, having a function of preventing a signal from returning to the power supply unit 600 while applying a potential to one terminals of the electron impact-type diodes 220A and 220B. A line provided with a Zener diode D3 and a line provided a resistor R8 and a Zener diode D4 are formed between the resistor R2 and the resistors R9 and R10, respectively. The resistor R8 has a function of absorbing the potential difference between the Zener diodes D3 and D4.

The ion detector is floated when positive and negative ions are detected. At this time, by using the Zener diodes D3 and D4, voltages can be supplied to the electron impact-type diodes 220A and 220B without increasing the power supply. For example, if 350 V is used as the Zener diode D3 and 250 V is used as the Zener diode D4, voltages different from each other can be supplied to the electron impact-type diodes 220A and 220B.

Figure 7A:
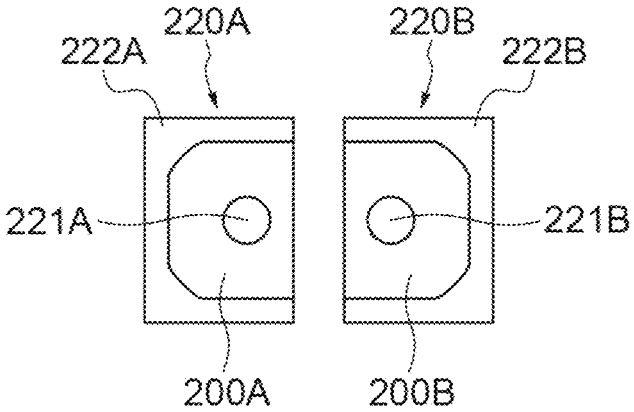
FIG. 7A is a plan view according to a modification example of the electron impact-type diode.

Here, FIG. 7A is a plan view according to a modification example of the electron impact-type diode. As illustrated in FIG. 7A, in the ion detectors 1 to 1B, the effective regions 221A and 221B can be disposed closer to each other by cutting out a part of the electron impact-type diodes 220A and 220B. Here, a part of the non-effective regions 222A and 222B is cut out such that lengths of a pair of sides facing each other in the electron impact-type diodes 220A and 220B are shortened when viewed in the incident direction of secondary electrons.

Accordingly, in the electron impact-type diodes 220A and 220B, when viewed in the incident direction of secondary electrons, the effective regions 221A and 221B are unevenly distributed in one direction (to a cut-out side) with respect to the centers of the non-effective regions 222A and 222B. Therefore, the effective regions 221A and 221B can be disposed closer to each other by disposing the two electron impact-type diodes 220A and 220B such that sides having the unevenly distributed effective regions 221A and 221B are adjacent to each other.

Figure 7B:
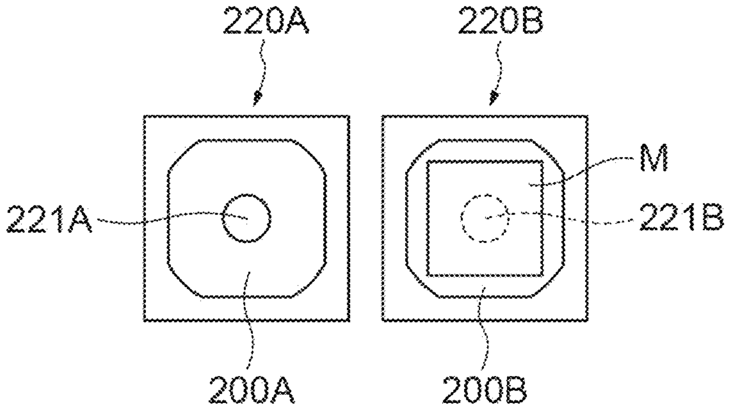
FIG. 7B is a plan view according to another modification example of the electron impact-type diode.

In addition, FIG. 7B is a plan view according to another modification example of the electron impact-type diode. As illustrated in FIG. 7B, the ion detectors 1 to 1B can include a mask M blocking some secondary electrons incident on at least one electron impact-type diode (here, the electron impact-type diode 220B) of the plurality of electron impact-type diodes. The mask M may be disposed at an arbitrary position between the focus electrode 122 and the electron impact-type diode 220B. As an example, the mask M may be formed on the electron incident surface 200B of the electron impact-type diode 220B. In this case, for example, the mask M may be formed through film formation in which A1 is subjected to vapor deposition on a surface serving as the electron incident surface 200B after processing of the electron impact-type diode 220B, film formation performed by implanting ions from a side of a surface serving as the electron impact-type diode 220B of the electron incident surface 200B during processing, or the like.

On the other hand, the mask M may be disposed away from the electron incident surface 200B. In this case, for example, the mask M may be formed by providing a mesh on a path toward the electron impact-type diode 220B for secondary electrons focused by the focus electrodes 121 and 122. In addition, in this case, the mask M may be provided in the opening A2 of the cover 210.

Moreover, at least one of the plurality of electron impact-type diodes may be disposed in a shifted manner such that a part of the effective region thereof is positioned on the outward side of the focusing diameter of secondary electrons to control the amount of incident secondary electrons to the electron impact-type diode.

As described above, in the ion detectors 1 to 1B, regarding a method of making the gains of at least two electron impact-type diodes of the plurality of electron impact-type diodes different from each other, a method of making drive voltages different from each other, a method of blocking secondary electrons using a mask, and a method of adjusting the amount of incident secondary electrons by shifting the effective region can be employed in an arbitrary combination. That is, as an example, while applying a certain method of the foregoing methods to a certain pair of electron impact-type diodes, another method of the foregoing methods may be applied to another pair of electron impact-type diodes. In addition, gains of three or more electron impact-type diodes may be made different from each other by arbitrarily applying a super-ordinate method.

Moreover, in the ion detectors 1 to 1B, from a viewpoint of making the gains of at least two electron impact-type diodes of a plurality of electron impact-type diodes different from each other, as illustrated in FIG. 2B, it is not essential to have a constitution in which the pair of electron impact-type diodes 220A and 220B are disposed such that corner parts projecting to a side opposite to the MCP 110 are formed due to the electron incident surfaces 200A and 200B thereof. In addition, in the ion detectors 1 to 1B, from a viewpoint of disposing the effective regions 221A and 221B closer to each other, it is not essential to have a constitution of making the gains of at least two electron impact-type diodes different from each other.

In addition, in contrast to the example illustrated in FIG. 2B, the pair of electron impact-type diodes 220A and 220B may be disposed such that corner parts projecting to the MCP 110 side are formed due to the electron incident surfaces 200A and 200B thereof (or due to a plane extending from the electron incident surfaces 200A and 200B). In this case, the output terminals 223A and 223B (extended lines of the output terminals 223A and 223B in the extending direction) may be disposed such that corner parts projecting to a side opposite to the electron incident surfaces 200A and 200B, and the MCP 110 are formed.

In addition, in the foregoing embodiment, an example of including two electron impact-type diodes 220A and 220B has been described, but the ion detectors 1 to 1B may include three or more electron impact-type diodes.

What is claimed is:

1. An ion detector comprising:

a microchannel plate configured to generate secondary electrons upon reception of ions incident thereon and multiply and output the generated secondary electrons;

a plurality of electron impact-type diodes having effective regions narrower than an effective region of the microchannel plate, configured to receive the secondary electrons incident thereon output from the microchannel plate, and multiply and detect the secondary electrons;

a focus electrode disposed between the microchannel plate and the electron impact-type diodes and configured to focus the secondary electrons toward the electron impact-type diodes; and a voltage supply part configured to apply a drive voltage to each of the plurality of electron impact-type diodes, wherein the voltage supply part applies drive voltages having values different from each other to at least two respective electron impact-type diodes of the plurality of electron impact-type diodes to make gains thereof different from each other, wherein the plurality of electron impact-type diodes include the effective region of the electron impact-type diode and a non-effective region positioned around the effective region of the electron impact-type diode when viewed in an incident direction of secondary electrons in the electron impact-type diodes, wherein when viewed in the incident direction, the effective region of the electron impact-type diode is unevenly distributed in at least one direction with respect to a center of the non-effective region, and wherein at least the two electron impact-type diodes are disposed such that sides thereof having the unevenly distributed effective regions of the electron impact-type diode are adjacent to each other.

2. The ion detector according to claim 1, wherein the effective region of each of the plurality of electron impact-type diodes is included in a focusing range of the secondary electrons due to the focus electrode.

3. The ion detector according to claim 1 further comprising:

a mask disposed between the focus electrode and the plurality of electron impact-type diodes and configured to block some of the secondary electrons incident on at least one of the electron impact-type diodes.

4. The ion detector according to claim 3, wherein the mask is formed on an electron incident surface of the plurality of electron impact-type diodes.

5. The ion detector according to claim 3, wherein the mask is disposed away from an electron incident surface of the plurality of electron impact-type diodes.

6. The ion detector according to claim 5 further comprising:

a cover disposed between the focus electrode and the plurality of electron impact-type diodes and having an opening formed to be wider than the effective regions of the plurality of electron impact-type diodes when viewed in an incident direction of secondary electrons of the plurality of electron impact-type diodes, wherein the mask is provided in the opening.

7. The ion detector according to claim 1, wherein the voltage supply part applies the drive voltages to at least the two electron impact-type diodes such that a detection range of the electron impact-type diode having a relatively high gain and a detection range of the electron impact-type diode having a relatively low gain have overlapping ranges overlapping each other.

8. An ion detector comprising:

a microchannel plate configured to generate secondary electrons upon reception of ions incident thereon and multiply and output the generated secondary electrons;

a plurality of electron impact-type diodes having effective regions narrower than an effective region of the microchannel plate, configured to receive the secondary electrons incident thereon output from the microchannel plate, and multiply and detect the secondary electrons;

a focus electrode disposed between the microchannel plate and the electron impact-type diodes and configured to focus the secondary electrons toward the electron impact-type diodes;

a mask disposed between the focus electrode and the plurality of electron impact-type diodes and configured to block some of the secondary electrons incident on at least one of the electron impact-type diodes;

a cover disposed between the focus electrode and the plurality of electron impact-type diodes and having an opening formed to be wider than the effective regions of the plurality of electron impact-type diodes when viewed in an incident direction of secondary electrons of the plurality of electron impact-type diodes; and a voltage supply part configured to apply a drive voltage to each of the plurality of electron impact-type diodes, wherein the voltage supply part applies drive voltages having values different from each other to at least two respective electron impact-type diodes of the plurality of electron impact-type diodes to make gains thereof different from each other, wherein the mask is disposed away from an electron incident surface of the plurality of electron impact-type diodes, and wherein the mask is provided in the opening.

* * * * *